United States Patent [19]

Lero et al.

[11] Patent Number: 5,285,881
[45] Date of Patent: Feb. 15, 1994

[54] SPLIT HINGE CLUTCH BRAKE AND METHOD TO ASSEMBLE

[75] Inventors: John M. Lero, Smithville; Bryan E. Simoncic, Kansas City, both of Mo.

[73] Assignee: Midland Brake, Inc., Kansas City, Mo.

[21] Appl. No.: 964,783

[22] Filed: Oct. 22, 1992

[51] Int. Cl.⁵ .................. F16D 67/02; F16D 65/12
[52] U.S. Cl. .................. 192/13 R; 192/DIG. 1; 188/218 XL; 29/453; 29/525
[58] Field of Search ............. 192/13 R, 18 R, 70.13, 192/107 R, DIG. 1; 188/73.2, 73.32, 218 XL; 29/453, 525

[56] References Cited

U.S. PATENT DOCUMENTS

| | | |
|---|---|---|
| 2,942,708 | 6/1960 | Eason . |
| 3,584,717 | 6/1971 | Suppes . |
| 4,043,437 | 8/1977 | Taylor ................. 182/13 R |
| 4,512,450 | 4/1985 | Babcock . |
| 5,031,739 | 7/1991 | Flotow et al. . |
| 5,076,406 | 12/1991 | Gregory et al. ............. 192/13 R |
| 5,099,970 | 3/1992 | Harris ................. 192/13 R |

*Primary Examiner*—Richard M. Lorence
*Attorney, Agent, or Firm*—Leydig, Voit & Mayer

[57] ABSTRACT

A clutch brake assembly is provided for operatively connecting to a rotatable shaft. The clutch brake comprises at least two arcuate members, each having first and second ends, and inwardly extending tabs for engaging standard grooves in the shaft. The clutch brake further includes a first fastener for pivotally coupling the first ends and a second fastener for connecting the second ends of the arcuate members to form an annular assembly about the shaft. The arcuate members may be preassembled such that they are pivotally coupled at their first ends prior to installation. During installation of the clutch brake around the shaft, the first arcuate member is installed around the shaft and the second arcuate member is then pivoted toward the shaft in a plane substantially perpendicular to the axis of the shaft. The second fastener is then installed.

19 Claims, 3 Drawing Sheets

SPLIT HINGE CLUTCH BRAKE AND METHOD TO ASSEMBLE

BACKGROUND OF THE INVENTION

1. Technical Field

The present invention is directed toward clutch brakes and more particularly toward clutch brakes for automotive vehicles.

2. Background Art

The clutch brake is typically utilized to slow down or stop the transmission input shaft from rotating when the clutch assembly is disengaged. The function is to aid in shifting the transmission into a reverse or forward gear, including upshifting and downshifting. A clutch brake is generally coupled to the transmission input shaft and disposed in a confined area between the release-bearing mechanism and an adjacent transmission. When the clutch pedal is selectively depressed or the release-bearing mechanism is forced toward the transmission, the front and rear faces of the brake are clamped to resist rotation. As the brake resists rotation, the rotational speed of the input shaft decreases, thereby allowing a smooth gear engagement.

Various clutch brakes designs have been utilized in the past. Each of these designs, however, has attendant disadvantages associated with the fabrication, assembly and installation, or maintenance of the brake once installed.

Early clutch brakes were formed as unitary annular metallic assemblies. Because these brakes were formed as unitary assemblies, this type of clutch brake could be replaced only by partially displacing the clutch or transmission so as to free one end of the shaft upon which the clutch brake was mounted. Once free, the clutch brake could be slid off and replaced. Thus, maintenance or replacement of the brake was a time consuming and costly procedure.

More recently, clutch brakes have been formed as two mating halves which are assembled and secured about the shaft. Two such split clutch brakes are shown in U.S. Pat. No. 4,512,450 to Daniel A. Babcock and U.S. Pat. No. 5,031,739 to Richard A. Flotow et al.

U.S. Pat. No. 4,512,450 to Babcock discloses a clutch brake comprising a pair of initially separate semi-annular sections having radial interlocking teeth, which permit the clutch brake to be assembled as it is installed on the driven shaft. The halves are placed along the periphery of the shaft with the tangs located in keyways along the shaft. The halves are then assembled by engaging the interlocking teeth, and then spot welding the components together. Alternately, roll pins are assembled into one half of the clutch brake and then are pressed into mating holes in the other half of the clutch brake to secure the components together.

U.S. Pat. No. 5,031,739 to Flotow, et al. discloses a clutch brake formed from a pair of identically shaped semi-annular sections. Each section has circumferentially extending protrusions located at either end, an outer protrusion at one end of the section and an inner protrusion at the other end of the section. Each outer protrusion has a radial clearance hole, and each inner protrusion has a radial threaded hole. In assembly, the sections are placed independently over the shaft. Threaded fasteners are inserted radially into the clearance holes and threaded into the threaded holes to secure the components together. The fasteners form the tangs for securing the brake to the shaft.

Each of these multi-component clutch brakes require extensive on-site assembly, as the separate components are assembled together as they are placed over the shaft, and/or once they are assembled over the shaft. This on-site assembly is generally cumbersome in that the assembler must reach through an approximately 5 inch by 8 inch inspection portion of the bell housing of the transmission in order to secure two fasteners along opposite sides of the shaft. Further, loose components, such as roll pins and threaded fasteners may be easily lost during the "blind" installation. These loose parts can damage the transmission if left loose in the transmission housing.

Additionally, special installation tools are often required to perform the assembly. Such tools may be unavailable on a remote repair site. Further, such dedicated tools may present significant expense. For example, welding equipment is quite expensive, and may not be readily available or portable.

The present invention is directed to overcoming one or more of the problems discussed above.

OBJECTS OF INVENTION

It is primary object of the invention to provide a clutch brake that may be easily installed onto a shaft. It is a more specific object to reduce the number of components and the complexity of the assembly and installation processes.

A related object of the invention to minimize on-site assembly of the clutch brake. A further object is to provide a clutch brake that may be partially preassembled at the manufacturing location.

Another object is to provide a clutch brake that may be easily disassembled. A related object is to provide a clutch brake that may be disassembled using readily available tools.

An additional object is to avoid damage to the transmission resulting from loose parts in the transmission.

Yet another object of the invention is to reduce the costs of manufacturing the brake components, as well as the labor costs associated with assembly of the clutch brake onto the shaft.

Yet another object of the invention to eliminate the need for expensive secondary machining of the parallel faces of the clutch brake.

SUMMARY OF THE INVENTION

In accomplishing these and other objects of the invention, there is provided a clutch brake assembly for operatively connecting to a rotatable shaft. The clutch brake comprises at least two arcuate members, each having first and second ends, and means for coupling the arcuate members to the shaft. The clutch brake further includes means for pivotally coupling the first ends and means for connecting the second ends of the arcuate members to form an annular assembly about the shaft.

The arcuate members may be preassembled such that they are pivotally coupled at their first ends prior to installation. In accomplishing this aspect of the invention, the arcuate members are pivotally coupled by the first fastening means at their first ends such that the second arcuate member pivots relative to the first arcuate member in a plane that substantially includes the first arcuate member, or, in other words, in a plane substantially perpendicular to the axis of the shaft as the assembly is installed on the shaft. Consequently, the first arcuate member may be positioned about the shaft and the second arcuate member then pivoted inward in a plane substantially perpendicular to the axis of the shaft to form a closed annular assembly about the shaft. The second fastening means may then be installed in the opposite ends of the arcuate members to couple the components together and secure the assembly to the shaft. The force for installing the second fastening means may be provided by a tool or the like, or, by a force created by depressing the clutch pedal.

In another aspect of the present invention, there is provided a method of installing a clutch brake onto a shaft without removing a bell housing from a transmission. The method comprises the steps of initially pivotally coupling the first ends of first and second arcuate members such that the second arcuate member pivots relative to the first arcuate member substantially in a plane which includes the first arcuate member, placing the connected assembly around the shaft, coupling the assembly to the shaft, pivoting the arcuate members to form a closed assembly around the shaft, and connecting the second ends of arcuate members.

Because the arcuate members may be preassembled before the clutch brake is installed around the shaft, on site assembly is reduced and the installation process is greatly simplified. As the force of the clutch itself may be used to install the second fastening means, the tools required for on site assembly of the brake are minimized. Further, the clutch brake may be installed without disassembling the transmission or removing the bell housing. Consequently, labor costs associated with the installation are also minimized.

In accomplishing these and other objects of the invention, these and other features and advantages of the invention will be more readily apparent upon reading the following description of a preferred exemplified embodiment of the invention and upon reference to the accompanying drawings wherein:

BRIEF DESCRIPTION OF THE DRAWINGS

FIG. 3 is a cross-sectional view taken along line 3—3 in FIG. 1.

While the invention will be described in connection with certain preferred embodiments, there is no intent to limit it to those embodiments. On the contrary, the intent is to cover all alternatives, modifications, and equivalents included within the spirit and scope of the invention as defined by the appended claims.

DESCRIPTION OF THE PREFERRED EMBODIMENT

Figure 1:
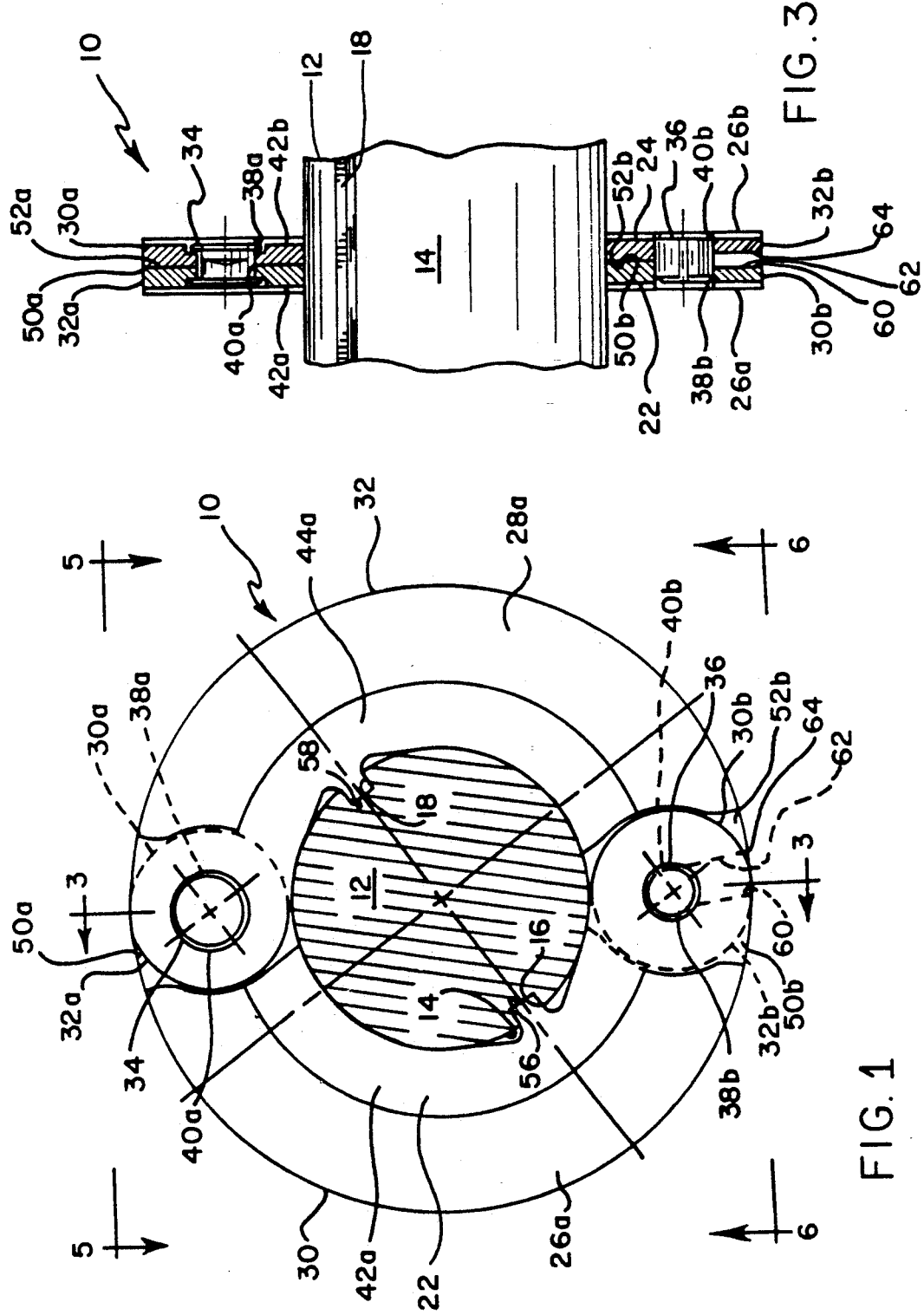
FIG. 1 is a plan view of a clutch brake assembly incorporating teachings of the invention. The clutch brake assembly is shown as installed on a shaft.

Turning now to the drawings, there is shown in FIG. 1, a clutch brake assembly 10 installed on the input shaft 12 of a transmission assembly (not shown). The input shaft 12 has an outer peripheral surface 14 in which axially extending grooves 16, 18 are typically formed. The shaft grooves 16, 18 may be formed to S.A.E. standards, or to alternate dimensions.

The clutch brake 10 is an annular assembly that is disposed about the periphery of the shaft 12 and coupled thereto by any appropriate means to prevent relative rotational movement. Preferably the clutch brake assembly 10 includes means for engaging the standard grooves 16, 18 along the shaft 12 to prevent relative rotational movement. The clutch brake 10 further comprises substantially flat front and rear faces 22, 24, only the front face 22 being visible in FIG. 1.

To minimize wear or prevent excessive wear of the front and rear faces 22, 24 of the brake assembly 10 during use, the brake assembly 10 typically includes a non-abrasive, friction material in the form of pads 26a and b, 28a and b, which extend along and are coupled to the front and rear faces 22, 24. (only the pads 26a, 28a disposed along the front face 22 are visible in FIG. 1.) The brake pads 26a and b, 28a and b may be formed of any appropriate material, such as conventional clutch or brake lining material, and may be coupled to the brake assembly 10 by any appropriate means.

While not illustrated in the drawings, generally the clutch brake 10 is disposed in a confined area between the release bearing mechanism (not shown) and the adjacent transmission. When the clutch pedal (not shown) is selectively depressed or the release bearing mechanism is forced toward the transmission, the front and rear faces 22, 24 of the clutch brake 10 are clamped to resist rotation. As the brake 10 resists rotation, the rotational speed of the input shaft 12 decreases, thereby allowing a smoother gear engagement.

While also not shown in the drawings, it will be appreciated that the clutch brake 10 and the engaging components are generally disposed in a bell housing which includes only a small inspection port. The inspection port is typically on the order of only 5×8 inches wide. Thus, the inspection port provides only limited access to the components housed in the bell housing.

In accordance with the invention, the clutch brake assembly 10 comprises at least two arcuate members 30, 32 having parallel front and rear faces 22, 24. While it will be appreciated that the brake assembly 10 may include more than two arcuate members, preferably the assembly 10 includes only two such members in order to minimize the number of components in the assembly 10, and, therefore, minimize fabrication and assembly costs. The arcuate members 20, 22 are coupled together at their respective ends 30a and b, 32a and b by fastening means 34, 36 to form the annular clutch brake assembly 10 shown in FIG. 1.

Figure 2:
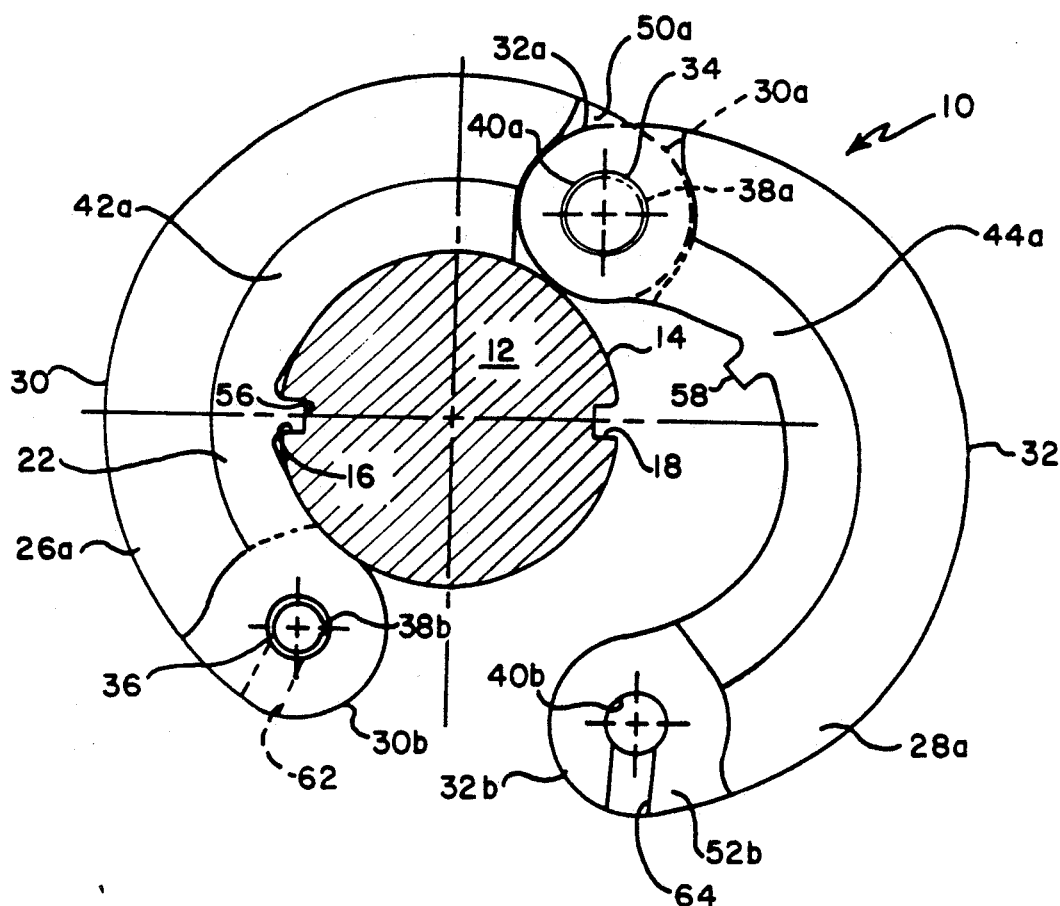
FIG. 2 is a plan view of the clutch brake of FIG. 1 shown in an open position.

According to an important aspect of the invention, the arcuate members 30, 32 may be preassembled before installing the assembly 10 on the shaft 12. In accomplishing this aspect of the invention, the arcuate members 30, 32 are pivotally coupled by the first fastening means 34 at their first ends 30a, 32a such that the second arcuate member 32 pivots relative to the first arcuate member 30 in a plane that substantially includes the first arcuate member 30, or, in other words, in a plane substantially perpendicular to the axis of the shaft 12 as the assembly is installed on the shaft 12, as illustrated in FIG. 2. Consequently, the first arcuate member 30 may be positioned about the shaft 12 and the second arcuate member 32 then pivoted inward in a plane substantially perpendicular to the axis of the shaft 12 to form a closed annular assembly about the shaft 12. The second fastening means 36 may then be installed in the opposite ends 30b, 32b of the arcuate members 30, 32 to couple the components together and secure the assembly 10 to the shaft 12.

The fastening means 34, 36 may be of any appropriate design and of any appropriate material. Preferably the fastening means 34, 36 comprise interference fasteners that mate with bores 38a and b, 40a and b provided in the ends 30a and b, 32a and b of the arcuate members 30, 32. The interference fasteners 34, 36 may be rivets or the like, or, alternately, they may be formed integrally with one of the bores at the respective ends of the arcuate members, i.e., the material about one of the bores may be drawn to form a lip about the bore which may be inserted into and pressed around the mating bore.

As shown more clearly in FIG. 3, the first fastening means 34, which pivotally couples the pivot ends 30a, 32a of the members 30, 32 preferably comprises a rivet or the like. According to an important feature of the invention, the rivet may be installed in the bores 38a, 40a at the factory in order to preassemble the arcuate members 30, 32. It will be appreciated, however, that alternate fastening means 34, 36 may be provided, so long as the fastening means 34, 36 provide a component of movement of the arcuate members 30, 32 in a plane substantially perpendicular to the axis of the shaft 12 so that the preassembled brake 10 may be installed along the shaft without disassembling the transmission. For example, a hinge or the like may be provided at the first ends 30a, 32a of the arcuate members 30, 32.

Similarly, the second fastening means 36 is preferably a rivet, dowel pin, or the like, which may be preassembled in one of the bores 38b or 40b at the opposite ends 30b, 32b of the arcuate members 30, 32. The fastening means 36, however, may be of an alternate design. In the embodiment illustrated in FIG. 2, the rivet 36 is preinstalled in the bore 38b of the first arcuate member 30. Similarly, the fastening means 36 could be preassembled in the bore 40b of the second arcuate member 32, or the fastening means 36 could be supplied as a separate piece.

Preferably, however, the fastening means 36 is preinstalled into one of the bores 38b, 40b to minimize the number of loose components and to greatly simplify installation of the clutch brake 10 on the shaft 12. Once the arcuate member 30 is positioned over the shaft 12 and the arcuate member 32 pivoted toward the shaft 12 to form a closed annular assembly about the shaft 12, the second fastening means 36 may simply be pressed closed by an appropriate tool in order to secure the components together. Preferably, the force for pressing the fastening means 36 closed in the bores 38b, 40b is supplied by depressing the clutch pedal to capture the assembly. Manifestly, the bores 38b, 40b must be accurately aligned in order to properly install the clutch brake 10 about the shaft 12.

Figure 4:
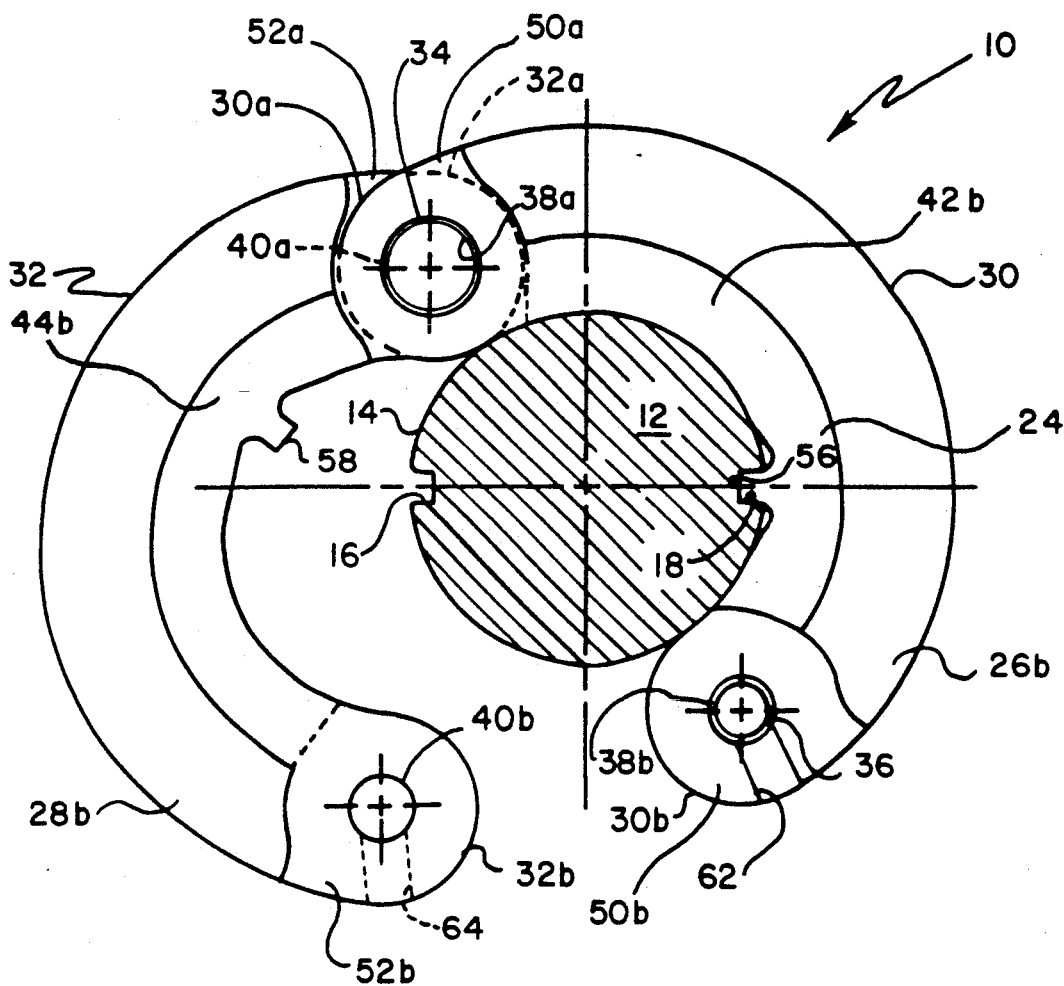
FIG. 4 is a plan view of the opposite face of the clutch brake shown in FIG. 2.

Referring again to FIGS. 1 and 2, the arcuate members 30, 32 have like constructions. Each arcuate member 30, 32 includes a front face 42a, 44a and a rear face 42b, 44b. The rear faces 42b, 44b are visible in FIG. 4, which illustrates the rear view of the device as shown in FIG. 2. The front faces 42a, 44a of the arcuate members 30, 32 form the front face 22 of the clutch brake assembly 10. Similarly, the rear faces 42b, 44b of the arcuate members 30, 32 form the rear face 24 of the clutch brake assembly 10.

As indicated above, the front and rear faces 22, 24 of the clutch brake assembly 10 are parallel in order to obtain proper operation of the clutch brake 10. Thus, according to an important aspect of the invention, the front faces 42a, 44a are coplanar to present a uniform front face 22. Similarly, the rear faces 42b, 44b are coplanar to present a uniform rear face 24. The arcuate members 30, 32 may be fabricated by any appropriate method that will provide the desired surface accuracy. For example, the arcuate members 30, 32 may be machined or die cast. The arcuate members 30, 32 are preferably formed in precision dies. Precision die components typically will not require secondary machining operations in order to provide the required planar front and rear faces 42a and b, 44a and b, and, therefore, may be less expensive to fabricate.

Figure 6:
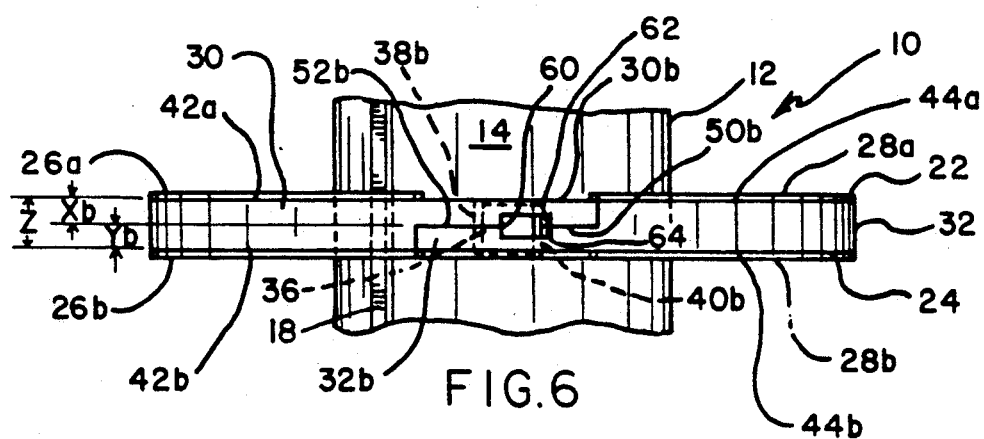
FIG. 6 is an elevational view taken along line 6—6 in FIG. 1.
Figure 5:
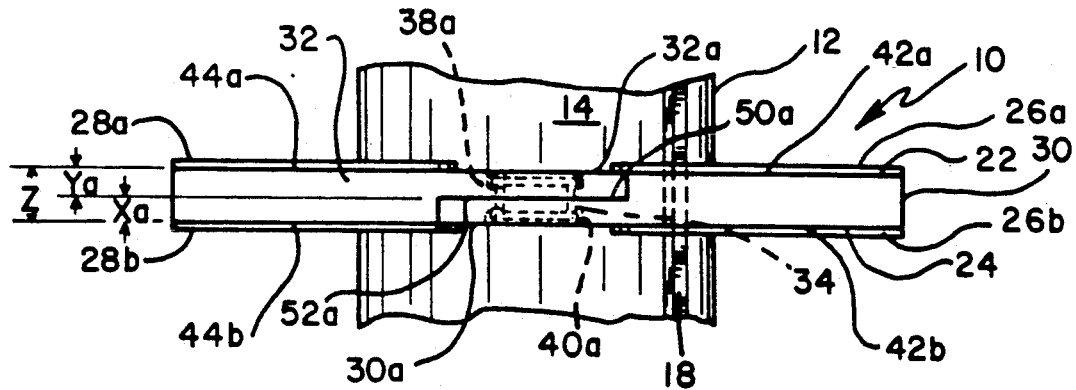
FIG. 5 is an elevational view taken along line 5—5 in FIG. 1.

In order to maintain parallel, coplanar front faces 42a, 44a and rear faces 42b, 44b and to provide means by which the members 30, 32 may be coupled, the ends 30a and b, 32a and b of the arcuate members 30, 32 include areas of reduced width or thickness, which are defined by recessed surfaces 50a and b, 52a and b that overlap when assembled. As shown in FIGS. 3, 5 and 6, the fastening means 34, 36 are assembled through bores 38a and b, 40a and b in the overlapping ends 30a and b, 32a and b to secure the arcuate members 30, 32 together.

Referring now to FIGS. 5 and 6, for ease of explanation, the thicknesses of the ends 30a and b, 32a and b are indicated generally as $X_a$, $X_b$, $Y_a$, and $Y_b$, respectively; the width of the arcuate members between the front and rear faces 22, 24 is indicated as Z. Preferably, when the clutch brake 10 is assembled onto the shaft 12, the combined thicknesses of the pivot ends 30a and 32a (i.e. $X_a+Y_a$), and the combined thicknesses of the opposite ends 30b and 32b of the arcuate members 30, 32 (i.e. $X_b+Y_b$) are each equal to the width of the arcuate members 30, 32 (i.e. $X_a+Y_a=Z$, and $X_b+Y_b=Z$), as shown in FIGS. 5 and 6. It will be appreciated, however, that the combined thicknesses (i.e. $X_a+Y_a$, and $X_b+Y_b$) may be of an alternate width, so long as the integrity of the clutch brake couplings may be maintained. Preferably, however, the combined thicknesses are less than the width of the arcuate components 30, 32 (i.e. $X_a+Y_a<Z$, and $X_b+Y_b<Z$) so as not to interfere with proper operation of the clutch brake assembly 10.

In the illustrated embodiment, the recessed surfaces 50a and b, 52a and b at the ends 30a and b, 32a and b, respectively, of arcuate members 30, 32 lie half the distance between the front and rear faces 40a and b, 42a and b of the members 30, 32 (i.e. $X_a=X_b=Y_a=Y_b=Z/2$). It will thus be appreciated that the arcuate members 30, 32 may be formed from the same dies, provided that the remaining dimensions of the configuration of the arcuate members 30, 32 are the same.

It will further be appreciated that the recessed surfaces 50a and b, 52a and b at the ends 30a and b, 32a and b of the arcuate members 30,32 could be disposed alternate distances from the front and rear faces 42a and b, 44a and b to provide different thicknesses. Alternately, the recessed surfaces 50a and b, 52a and b could be disposed at an angle to the front and rear faces 42a and b, 44a and b, rather than parallel to the faces, as in the illustrated embodiment. The arcuate members 30, 32, however, would not pivot solely in the plane perpendicular to the axis of the shaft 12 if the recessed surfaces 50a and b, 52a and b were angled. Rather, there would be a component of movement in a plane which would include the axis of the shaft 12 as well as the plane perpendicular to the shaft axis. The movement of the arcuate member 32 in the plane perpendicular to the axis of the shaft 12, however, must be sufficient to permit the arcuate members 30, 32 to be positioned about the shaft 12 when the arcuate members 30, 32 are pivotally coupled at the first end 30a, 32a, as described herein.

So that the front and rear faces 22, 24 of the clutch brake 10 will be consistent at the end portions 30a and b, 32a and b, the ends 30a and b, 32a and b are preferably rounded, and the recessed surfaces 50a and b, 52a and b are substantially annular. Likewise, the ends of the abrasive pads 26a and b, 28a and b comprise a curved edge adjacent the ends 30a and b, 32a and b to accommodate assembly of the clutch brake 10. Consequently, the mating curved surfaces provide substantially even front and rear faces 22, 24.

To secure the clutch brake assembly 10 to the shaft 12 to prevent relative rotational movement, the clutch brake assembly 10 is provided with one or more tabs 56, 58, or the like, which extend radially inward from the inner annular surface of the arcuate members 30, 32. In the preferred embodiment, the clutch brake 10 is provided with two such tabs 56, 58 which are appropriately spaced to engage the shaft grooves 16, 18 in the shaft 12. The tabs 56, 58 will typically be disposed 180° apart. While the tabs 56, 58 may be of any appropriate shape, they are preferably rectangular in order to ensure secure engagement of the grooves 16, 18.

So that the clutch brake assembly 10 may be easily installed on the shaft 12, the placement of the tabs 56, 58 along the inner annular surface of the arcuate members 30, 32 preferably provides a snap-in action when the first arcuate member 30 is installed on the shaft 12. This snap-in action is provided by locating the tab 56 on the first arcuate member 30 in an over-center position, closer to the free end 30b than the pivot end 30a of the arcuate member 30. As a result, when the first arcuate member 30 is positioned about the shaft 12, it will be held in position until the second arcuate member 32 is pivoted toward the first arcuate member 30 to close the clutch brake assembly 10 about the shaft 12.

It will be appreciated that when the tab 56 is located at an over-center position near the free end 30b of the first arcuate member 30a, the remaining tab 58 would typically be located in an over-center position near the pivot end 32a of the second arcuate member 32. The location of the tab 58 nearer the pivot end 32a provides for smoother engagement of the tab 58 with the shaft groove 18 as the clutch brake assembly 10 is closed about the shaft 12. While the tab 56, 58 locations have been described with reference to over-centered positions, the tabs 56, 58 could be located at alternate positions along the inner arcuate surfaces of the arcuate members 30, 32, respectively.

In order to provide means by which the clutch brake assembly 10 may be removed from the shaft 12 for replacement or maintenance purposes, there is provided an opening between the recessed surfaces 50b, 52b of the arcuate members 30, 32, as shown in FIGS. 1, 3, and 6. As shown in FIGS. 1-4 and 6, the opening 60 is formed by recesses 62, 64 formed in the recessed surfaces 50b, 52b. When the arcuate members 30, 32 are pivoted into the closed position shown in FIGS. 1, 3, and 6, the recesses 62, 64 coincide to form the opening 60. When it is desirable to remove the clutch brake assembly 10 from the shaft 12, a tool such as a screwdriver or the like may be inserted into the opening 60, and the arcuate members 30, 32 then pried apart. The arcuate members 30, 32 may then be pivoted open to remove the clutch brake assembly 10 from the shaft 12.

In summary, a clutch brake assembly 10 is provided for operatively connecting to a rotatable shaft 12. The clutch brake 10 comprises at least two arcuate members 30, 32, each having first and second ends 30a and b, 32a and b, and means for coupling the arcuate members to the shaft 56, 58. The clutch brake 10 further includes means 34 for pivotally coupling the first ends 30a, 32b and means 36 for connecting the second ends 30b, 32b of the arcuate members 30, 32 to form an annular assembly about the shaft 10. The arcuate members 30, 32 may be preassembled such that they are pivotally coupled at their first ends 30a, 32a prior to installation. During installation of the clutch brake 10 around the shaft 12, the first arcuate member 30 is installed around the shaft 12 and the second arcuate member 32 is then pivoted toward the shaft 12 in a plane substantially perpendicular to the axis of the shaft 12. The connecting means 36 is then installed. The preassembly of the arcuate members 30, 32 greatly simplifies the assembly and installation process and considerably reduces the number of loose components during installation.

It is to be understood that any allowed claims based on this application are to be accorded a range of equivalence commensurate in scope with the advance over the prior art.

What is claimed is:

1. A clutch brake for operably connecting to a rotatable shaft, the brake comprising:
    a first arcuate member having a first end and a second end;
    a second arcuate member having a first end and a second end;
    means for pivotally coupling the first end of the first arcuate member to the first end of the second arcuate member, such that the second arcuate member pivots relative to the first arcuate member in a plane substantially including the arcuate members to form an annular assembly;
    means for coupling the arcuate members to the shaft; and
    means for connecting the second end of the first arcuate member to the second end of the second arcuate member when the arcuate members form the annular assembly, whereby engagement of the means for connecting with the second ends prevents further pivoting of the arcuate members relative to one another.

2. The clutch brake of claim 1 wherein the brake presents spaced parallel planar side faces when the first and second arcuate members are disposed such that they form the annular assembly.

3. The clutch brake of claim 1 wherein the spaced parallel planar side faces define an assembly width, the ends of the arcuate members having widths less than the assembly width, the first ends overlapping and the second ends overlapping when the arcuate members are disposed such that they form the annular assembly.

4. The clutch brake of claim 1 wherein the means for pivotally coupling comprises a bore through the first end of one of the arcuate members, and a fastener, the fastener being disposed within the bore and coupled to the first end of the other arcuate member to pivotally couple the arcuate members together.

5. The clutch brake of claim 1 wherein the means for connecting comprises a bore through of the second end of one of the arcuate members, and a fastener, the fastener being disposed within the bore and coupled to the second end of the other arcuate member to pivotally connect the arcuate members together.

6. The clutch brake of claim 1 wherein the means for coupling the arcuate members to the shaft comprises at least one tab located on one of the arcuate members for engaging an axial groove on the shaft.

7. The clutch brake of claim 6 comprising a first tab located on the first arcuate member and a second tab located on the second arcuate member for engaging axial grooves on the shaft.

8. The clutch brake of claim 6 wherein the at least one tab is narrower than the groove.

9. A method of installing a clutch brake onto a shaft disposed within a bell housing of a transmission assembly whereby the clutch brake may be installed without removing the bell housing from the transmission assembly, the method comprising the steps of:
 pivotally coupling a first end of a first arcuate member to a first end of a second arcuate member such that the second arcuate member pivots relative to the first arcuate member substantially in a plane which includes the first arcuate member;
 placing the pivotally coupled first arcuate member around the shaft;
 pivoting the second arcuate member toward the first arcuate member to form an annular assembly about the shaft;
 coupling the arcuate members to the shaft; and
 connecting a second end of the first arcuate member to a second end of the second arcuate member.

10. The method of claim 9 wherein the step of connecting the second end of the arcuate members includes the step of placing a fastener through bores in the second ends of the arcuate members.

11. The method of claim 10 wherein the step of connecting the second ends of the arcuate members further includes the step of actuating the clutch to press the fastener into the bores.

12. A clutch brake for operably connecting to a rotatable shaft having an axis and first and second axially extending grooves, the brake comprising:
 a first arcuate member having a first end and a second end, a first transverse bore at the first end, and a second transverse bore at the second end, and spaced parallel planar side faces defining a width;
 a second arcuate member having a first end and a second end, a first transverse bore at the first end, and a second transverse bore at the second end, spaced parallel planar side faces defining a width, the width of the second arcuate member being substantially equal to the width of the first arcuate member such that the side faces of the second arcuate member are co-planar with the side faces of the first arcuate member;
 a first fastener slidably fitted into the transverse bores of the first end of the arcuate members to pivotally couple the arcuate members such that the second arcuate member is movable relative to the first arcuate member in a plane substantially including the arcuate members to form an annular assembly;
 a second fastener fitted into one of the transverse bores of the second ends of the arcuate members and adapted to be fitted into the other transverse bore of the second end of the other arcuate member when the arcuate members form the annular assembly, whereby fitting of the second fastener with transverse bores of both the second ends prevents further pivoting of the arcuate members relative to one another; and
 a first tab located on the first arcuate member for engaging the first axial groove, and a second tab located on the second arcuate member for engaging the second axial groove to couple the arcuate members to the shaft.

13. The clutch brake of claim 12, further comprising pads secured to the spaced parallel planar faces.

14. The clutch brake of claim 12 wherein the first fastener is a rivet.

15. The clutch brake of claim 12 wherein the second fastener is a pin.

16. The clutch brake of claim 12 wherein the first and second ends of the arcuate members define ears each having a width, the first end ears overlapping when the arcuate members are installed on the shaft, and the second end ears overlapping when the arcuate members are installed on the shaft, the combined widths of the first ears being no greater than the width of the first arcuate member and the width of the second arcuate member, and the combined widths of the second arcuate members being no greater than the width of the first arcuate member and the width of the second arcuate member.

17. The clutch brake of claim 16 wherein the width of each ear is substantially one half of the width of the each arcuate member.

18. The clutch brake of claim 12 wherein the arcuate members form a substantially annular inner surface when coupled, the tabs extending axially inward from the inner surface and being spaced substantially 180° apart.

19. The clutch brake of claim 18 wherein the second tab is disposed closer to the first end of the second arcuate member, and the first tab is disposed closer to the second end of the first arcuate member, such that when the first arcuate member is installed on the shaft first it is temporarily secured to the shaft while the second arcuate member is being installed.

* * * * *